Dec. 18, 1962 LE ROY M. TAYLOR 3,069,671
ALARM-EQUIPPED DRAIN PAN
Filed Dec. 31, 1959
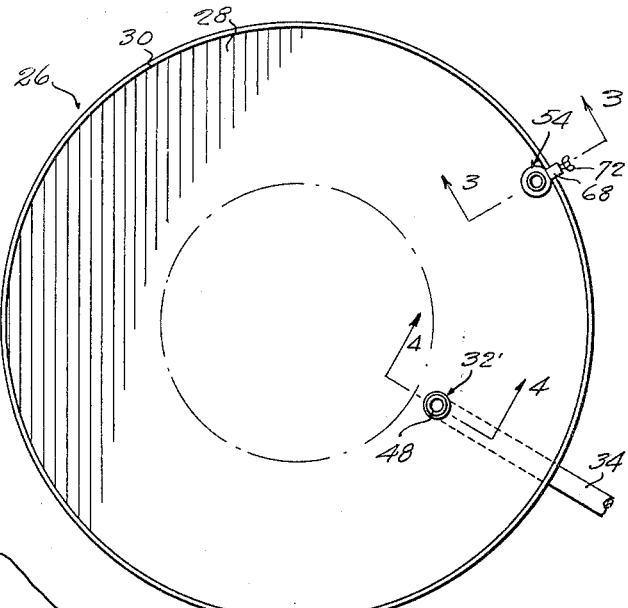
FIG. 1.
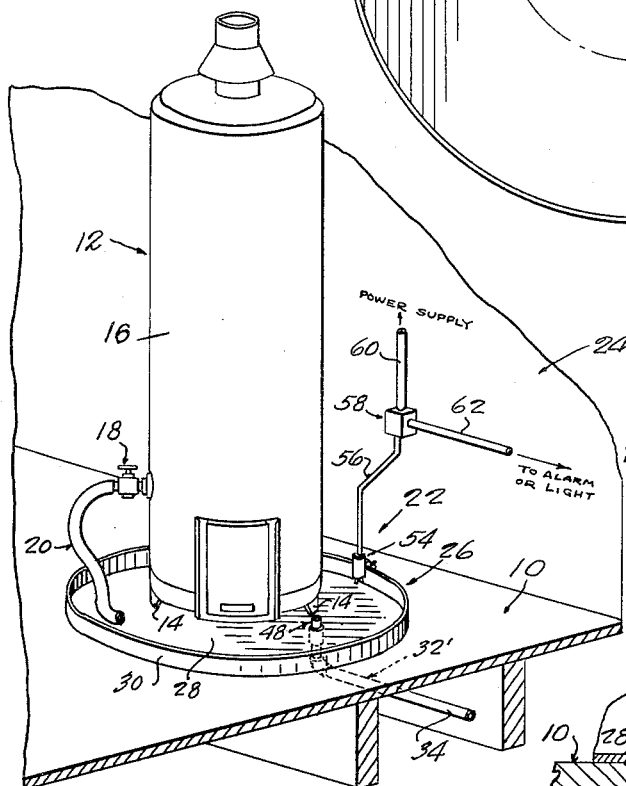
FIG. 2.
FIG. 3.
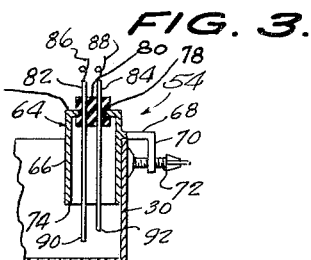
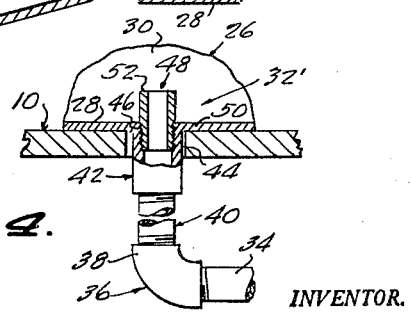
FIG. 4.
INVENTOR.
LE ROY M. TAYLOR,
BY
McMorrow, Berman & Davidson
ATTORNEYS.

United States Patent Office 3,069,671
Patented Dec. 18, 1962

3,069,671
ALARM-EQUIPPED DRAIN PAN
Le Roy M. Taylor, 4476 S. Cherokee St.,
Englewood, Colo.
Filed Dec. 31, 1959, Ser. No. 863,346
4 Claims. (Cl. 340—244)

This invention relates to a novel alarm-equipped safety drain pan for such as hot water heaters.

The primary object of the invention is to provide means to be installed beneath a domestic or industrial hot water heater, especially of the vertical type, whereby accumulation of water from the heater, caused by leakage and/or an opened drain pipe, operates an alarm, so as to warn the housewife or other attendant of the condition, in time to enable shutting down of the heater and/or closing of the drain pipe, before damage to the heater or its surroundings can take place.

Another object of the invention is the provision of means, of the character indicated above, in the form of an assembly comprising a pan which can be easily installed on the floor beneath a water heater, to receive water leaking therefrom and/or water intentionally drained from the heater, a switch mounted on the pan to be closed by water rising in the pan thereto, and an electrical alarm operated by the closing of the switch.

A further object of the invention is to provide a device of the character indicated above which includes a run-off pipe, in communication with the pan and adapted to be connected to a drainage, for preventing inconvenient or damaging over-flow of water from the pan, the run-off pipe having an upstanding nipple within the pan which can be removed for running-off any water in the pan, and which, when in place, prevents run-off of water from the pan until and unless the water rises in the pan to a predetermined level.

Other important objects and advantageous features of the invention will be apparent from the following description and the accompanying drawings, wherein, for purposes of illustration only, a specific form of the invention is set forth in detail.

In the drawings:

FIGURE 1 is a schematic perspective view, partly broken away and in section, showing a device of the invention incorporated in an upright domestic hot water heater installation;

FIGURE 2 is an enlarged top plan view of the pan of the device, showing the locations of the switch and the water run-off means;

FIGURE 3 is an enlarged fragmentary vertical section taken on the line 3—3 of FIGURE 2; and, FIGURE 4 is an enlarged and contracted fragmentary vertical section taken on the line 4—4 of FIGURE 2.

Referring in detail to the drawings, wherein like numerals designate like parts throughout the several views, the numeral 10 designates a hot water heater support, such as a floor, upon which the base of a vertical gas or electrically fired water heater 12 is usually rested, such base usually comprising spaced feet 14. The heater 12 has a sidewall 16, and a drain valve fitting 18 is usually provided, to enable periodic draining of the heater, for maintenance purposes, and is usually mounted to extend laterally from the sidewall 16. In the present instance, the fitting 18 is provided with a flexible drain hose 20.

In accordance with the present invention, an alarm-equipped safety drain pan assembly, generally designated 22, is provided which is placed upon the floor 10 beneath the water heater 12, and one or more of its components are mounted on support means adjacent to the heater, such as a wall 24.

The illustrated assembly 22 comprises a flat pan 26, of any suitable shape, here shown as circular, which is substantially larger in diameter than the heater 12, and has a flat bottom wall 28, and an upstanding peripheral sidewall 30. The flexible drain hose 20 has its open lower end 32 disposed within the pan 26.

At any suitable location around the pan bottom wall 28, and preferably spaced between the heater 12, the drain hose 20, and the pan sidewall 30, is a water run-off conduit 32', which comprises a pipe 34 preferably extending along the underside of the floor 10 and leading to such as a house drain pipe (not shown), one end of the pipe 34 having an L secured thereon having an upstanding arm 38 into which is threaded the lower end of an upstanding perpendicular nipple 40. The nipple 40 is threaded at its upper end into the lower end of an upstanding coupling 42, which rises through an opening 44 provided in the floor 10. The coupling 42 depends from and is preferably permanently fixed in an opening 46 in the pan bottom wall 28. An ustanding removable nipple 48 is threaded at its lower end, as indicated at 50, in the upper end of the coupling 42, and rises above the pan bottom wall 28, with its open end 52 at a predetermined level above the pan bottom wall, on the order of two inches, so as to provide for a substantial accumulation of water in the pan 26 before reaching the open upper end of the nipple 48 and running off therethrough. When it is desired to run off all water from the pan 26, the nipple 48 is simply removed from the coupling 42, so that the water can run off through the coupling 42 and empty the pan 26.

The assembly 22 further comprises a rising water closed switch 54 which is preferably mounted on the pan sidewall 30, and which is connected by a conduit 56 to a step-down transformer 58, which is preferably mounted above the pan 26, as on the wall 24. Severally connected to and leading from the transformer 58 is a power supply conduit 60 and an alarm energizing conduit 62. The alarm (not shown) energized by the conduit 62, whenever the switch 54 is closed, by water rising in the pan 26, can be of a suitable visual or audible type or both visual and audible, and is strategically located, as in the kitchen of the house.

The switch 54 is preferably of the spaced electrode type, and, as shown in FIGURE 3, can comprise a vertical housing 64 having a sidewall 66 on which is fixed a lateral arm 68 terminating in a depending portion 70, through which is threaded a clamping screw 72. The housing 64 is placed with its sidewall 66 against the inward side of the pan sidewall 30 with the arm 68 upon the upper edge thereof, and with the screw 72 turned against the outward side of the pan sidewall 30, with the open lower end 74 of the switch housing 64 spaced above the pan bottom wall 28.

The switch housing 64 has a top wall 76 formed with a central opening 78 through which is secured an insulator 80 through which are securably passed a pair of vertical, laterally spaced electrode rods 82 and 84, to whose upper ends are connected wires 86 and 88, respectively, of the conduit 56. The electrode rods extend below the open lower end 74 of the housing 64, and have lower ends 90 and 92 at different levels above the pan bottom wall 28, the lower end 92 being located above the lower end 90.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a support, a pan having a bottom wall resting upon said support and an upstanding sidewall, a vertical hot water heater resting upon said bottom wall and spaced from said sidewall, the pan being disposed to receive water leaked from the heater, a pan water run-off conduit comprising a vertical coupling secured in an opening in the pan bottom wall and having an open upper end flush with the pan bottom wall, and an upstanding nipple removably engaged in the upper end of the coupling, said nipple having an open upper end spaced above the pan bottom wall at a predetermined water overflow level in the pan, the nipple being removable from the coupling for emptying the pan, and a water level operated alarm energizing switch mounted on the pan sidewall and exposed in the pan substantially at said overflow level.

2. In combination, a support, a pan having a bottom wall resting upon said support and an upstanding sidewall, a vertical hot water heater resting upon said bottom wall and spaced from said sidewall, the pan being disposed to receive water leaked from the heater, a pan water run-off conduit comprising a vertical coupling secured in an opening in the pan bottom wall and having an open upper end flush with the pan bottom wall, and an upstanding nipple removably engaged in the upper end of the coupling, said nipple having an open upper end spaced above the pan bottom wall at a predetermined water overflow level in the pan, the nipple being removable from the coupling for emptying the pan, and a water level operated alarm energizing switch mounted on the pan sidewall and exposed in the pan substantially at said overflow level, said switch comprising a pair of vertical electrically unconnected electrodes having lower ends positioned in the region of said overflow level.

3. In combination, a support, a pan having a bottom wall resting upon said support and an upstanding sidewall, a vertical hot water heater resting upon said bottom wall and spaced from said sidewall, the pan being disposed to receive water leaked from the heater, a pan water run-off conduit comprising a vertical coupling secured in an opening in the pan bottom wall and having an open upper end flush with the pan bottom wall, and an upstanding nipple removably engaged in the upper end of the coupling, said nipple having an open upper end spaced above the pan bottom wall at a predetermined water overflow level in the pan, the nipple being removable from the coupling for emptying the pan, and a water level operated alarm energizing switch mounted on the pan sidewall and exposed in the pan substantially at said overflow level, said switch comprising a vertical hollow housing spaced above the pan bottom wall and having a sidewall, an insulator mounted in the upper part of the housing, a pair of laterally spaced vertical electrode rods extending through said insulator, said rods having lower ends extending below the housing.

4. In combination, a drip pan having a bottom wall and an upstanding side wall, a hot water heater smaller in diameter than the pan and resting upon said bottom wall within and spaced from the side wall, said bottom wall having an opening spaced between the heater and the pan side wall, a drain nipple secured in said opening and having an open upper end spaced above the bottom wall, and an electric water level alarm switch mounted on the pan side wall and having spaced electrodes having lower ends positioned within the pan and spaced above the pan bottom wall substantially on the level of the upper end of said nipple, the electrodes being adapted to be bridged by water rising above the level of the upper end of the nipple.

References Cited in the file of this patent

UNITED STATES PATENTS

| | | |
|---|---|---|
| 393,828 | Hall | Dec. 4, 1888 |
| 819,850 | Butt | May 8, 1906 |
| 871,914 | Conover | Nov. 26, 1907 |
| 873,503 | Casale | Dec. 10, 1907 |
| 904,539 | Koenig | Nov. 24, 1908 |
| 1,066,479 | Fiala | July 8, 1913 |
| 1,577,781 | Adams | Mar. 23, 1926 |
| 1,915,576 | Mullen | June 27, 1933 |
| 2,724,401 | Page | Nov. 22, 1955 |
| 2,836,808 | Walker | May 27, 1958 |

FOREIGN PATENTS

| | | |
|---|---|---|
| 43,179 | Germany | May 14, 1888 |
| 726,056 | Great Britain | Mar. 16, 1955 |
| 321,795 | Switzerland | July 15, 1957 |